United States Patent
Sanchez et al.

(10) Patent No.: US 8,424,281 B2
(45) Date of Patent: Apr. 23, 2013

(54) METHOD AND APPARATUS FOR FACILITATING COOLING OF A STEAM TURBINE COMPONENT

(75) Inventors: Nestor Hernandez Sanchez, Schenectady, NY (US); Clifford Edward Samson, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 938 days.

(21) Appl. No.: 11/847,188

(22) Filed: Aug. 29, 2007

(65) Prior Publication Data

US 2009/0056341 A1 Mar. 5, 2009

(51) Int. Cl.
*F02C 6/00* (2006.01)
*F02C 1/04* (2006.01)
*F22B 37/00* (2006.01)

(52) U.S. Cl.
USPC ............................ 60/39.182; 60/650; 122/7 R

(58) Field of Classification Search ............... 60/39.182, 60/650, 653; 122/7 R, 7 B
See application file for complete search history.

(56) References Cited

U.S. PATENT DOCUMENTS

| | | | |
|---|---|---|---|
| 2,451,261 A * | 10/1948 | Warren et al. .................... | 60/657 |
| 3,623,457 A | 11/1971 | Dillstrom | |
| 3,979,914 A | 9/1976 | Weber | |
| 4,282,708 A * | 8/1981 | Kuribayashi et al. ........... | 60/778 |
| 4,393,657 A | 7/1983 | Takatama | |
| 4,519,207 A * | 5/1985 | Okabe et al. ................ | 60/39.182 |
| 4,571,935 A * | 2/1986 | Rice .................................. | 60/775 |
| 5,111,662 A | 5/1992 | Nicolin et al. | |
| 5,412,936 A * | 5/1995 | Lee et al. ......................... | 60/801 |
| 5,613,356 A | 3/1997 | Frutschi | |
| 5,689,948 A | 11/1997 | Frutschi | |
| 6,003,317 A * | 12/1999 | Neubert .......................... | 60/653 |
| 6,116,017 A | 9/2000 | Mori et al. | |
| 6,223,520 B1 | 5/2001 | Kita | |
| 6,272,841 B2 | 8/2001 | Yamamoto et al. | |
| 6,279,308 B1 | 8/2001 | Sonoda et al. | |
| 6,279,311 B1 | 8/2001 | Goto | |
| 6,301,874 B1 | 10/2001 | Wakazono et al. | |
| 6,324,829 B1 | 12/2001 | Kita et al. | |
| 6,338,241 B1 * | 1/2002 | Shibuya et al. ............ | 60/39.182 |

(Continued)

FOREIGN PATENT DOCUMENTS

| | | |
|---|---|---|
| JP | 58117306 A | 7/1983 |
| JP | 06317105 A | 11/1994 |

(Continued)

OTHER PUBLICATIONS

D.L. Chase and P.T. Kehoe, "GE Combined-Cycle Product Line and Performance", GE Power Systems, Schenectady, NY, Oct. 2000, pp. 1-15.

(Continued)

*Primary Examiner* — William H Rodriguez
*Assistant Examiner* — Carlos A Rivera
(74) *Attorney, Agent, or Firm* — Armstrong Teasdale LLP

(57) ABSTRACT

A method of operating a power plant is provided. The method includes channeling saturated steam at a first pressure to a pressure control device, superheating the steam by decreasing the pressure of the saturated steam from the first pressure to a second pressure using the pressure control valve, and channeling the superheated steam towards a steam turbine component to facilitate cooling the component.

20 Claims, 4 Drawing Sheets

U.S. PATENT DOCUMENTS

| | | | |
|---|---|---|---|
| 6,354,073 | B1 | 3/2002 | Hiramoto et al. |
| 6,442,926 | B2 | 9/2002 | Yasuraoka et al. |
| 6,460,325 | B2 | 10/2002 | Liebig et al. |
| 2007/0113562 | A1* | 5/2007 | Tomlinson et al. ............. 60/778 |
| 2007/0245736 | A1* | 10/2007 | Barnicki ......................... 60/670 |

FOREIGN PATENT DOCUMENTS

| | | |
|---|---|---|
| JP | 09088519 | 3/1997 |
| JP | 11117715 | 4/1999 |
| JP | 2006046088 A | 2/2006 |

OTHER PUBLICATIONS

Patent Abstracts of Japan, Application No. 07249668, filed Sep. 27, 1995, "Starting Method of Steam Cooling Type Composite Power Generating Plant", 1 page.

Patent Abstracts of Japan, Application No. 09296484, filed Oct. 15, 1997, "Steam Turbine Cooling System for Compound Cycle Power Plant", 1 page.

Jp Office Action dated Oct. 30, 2012 from corresponding Application No. 2008-217463 along with unofficial English translation.

* cited by examiner

METHOD AND APPARATUS FOR FACILITATING COOLING OF A STEAM TURBINE COMPONENT

BACKGROUND OF THE INVENTION

This invention relates generally to steam turbine engine components, and, more specifically, to methods and apparatus that facilitate cooling of steam turbine engine components.

At least some known combined-cycle power plants include a steam turbine that is coupled to the gas turbine with a single shaft. Such power plants may be referred to as having a single-shaft, combined-cycle configuration. During at least some operations of such a power plant, the gas turbine may carry a load while the steam turbine does not carry a load. However, during such operations, because the steam and gas turbines are coupled to the same common shaft, the steam turbine must operate at full speed without carrying a load. When the steam turbine is at full-speed, no-load operation, at least some steam turbine components may increase in temperature because of windage within the steam turbine.

To facilitate preventing wear to components, in at least some known single-shaft, combined-cycle power plants, the steam turbine is uncoupled from the gas turbine when the gas turbine is carrying a load, but steam turbine is not carrying a load. As such, the steam turbine does not operate at full-speed, no-load conditions while the gas turbine is carrying a load. However, before the steam turbine can take on a load, the steam turbine must be re-coupled to the gas turbine. As is known, synchronizing steam turbine operation with gas turbine operation during re-coupling may be a difficult and time-consuming task.

Other known single-shaft, combined-cycle power plants allow the steam turbine to operate at full-speed, no-load operation while the gas turbine is carrying load. Such plants utilize a cooling fluid, such as air or steam, to facilitate cooling the steam turbine. However, before steam can be introduced into a steam turbine, the steam must be substantially free of water droplets because such droplets may cause damage therein. To facilitate preventing water droplets from being introduced into the steam turbine, at least some known combined-cycle plants channel the steam to a superheater integral with an auxiliary boiler to superheat the steam before channeling the steam to the steam turbine. However, such superheaters are generally physically large and may be costly to purchase and/or operate because such superheaters generally require a considerable power supply to ensure all of the water within the steam is substantially vaporized.

BRIEF DESCRIPTION OF THE INVENTION

In one aspect, a method of cooling a steam turbine component is provided. The method includes channeling saturated steam at a first pressure to a pressure control device, superheating the steam by decreasing the pressure of the saturated steam from the first pressure to a second pressure using the pressure control device, and channeling the superheated steam towards a steam turbine component to facilitate cooling the component.

In another aspect, a cooling system for use with a steam turbine is provided. The cooling system includes a saturated steam source and a pressure control device coupled in flow communication with the saturated steam source. The pressure control device facilitates reducing the pressure of saturated steam to form superheated steam. The pressure control device is configured to couple in flow communication with the steam turbine for supplying superheated steam thereto.

In still another aspect, a combined-cycle system is provided. The combined-cycle system includes a gas turbine, a steam turbine coupled to the gas turbine via a rotor shaft, and a steam turbine cooling system coupled in flow communication with the steam turbine. The cooling system includes a saturated steam source and a pressure control device coupled in flow communication with the saturated steam source. The pressure control device is configured to superheat saturated steam.

DETAILED DESCRIPTION OF THE INVENTION

Figure 1:
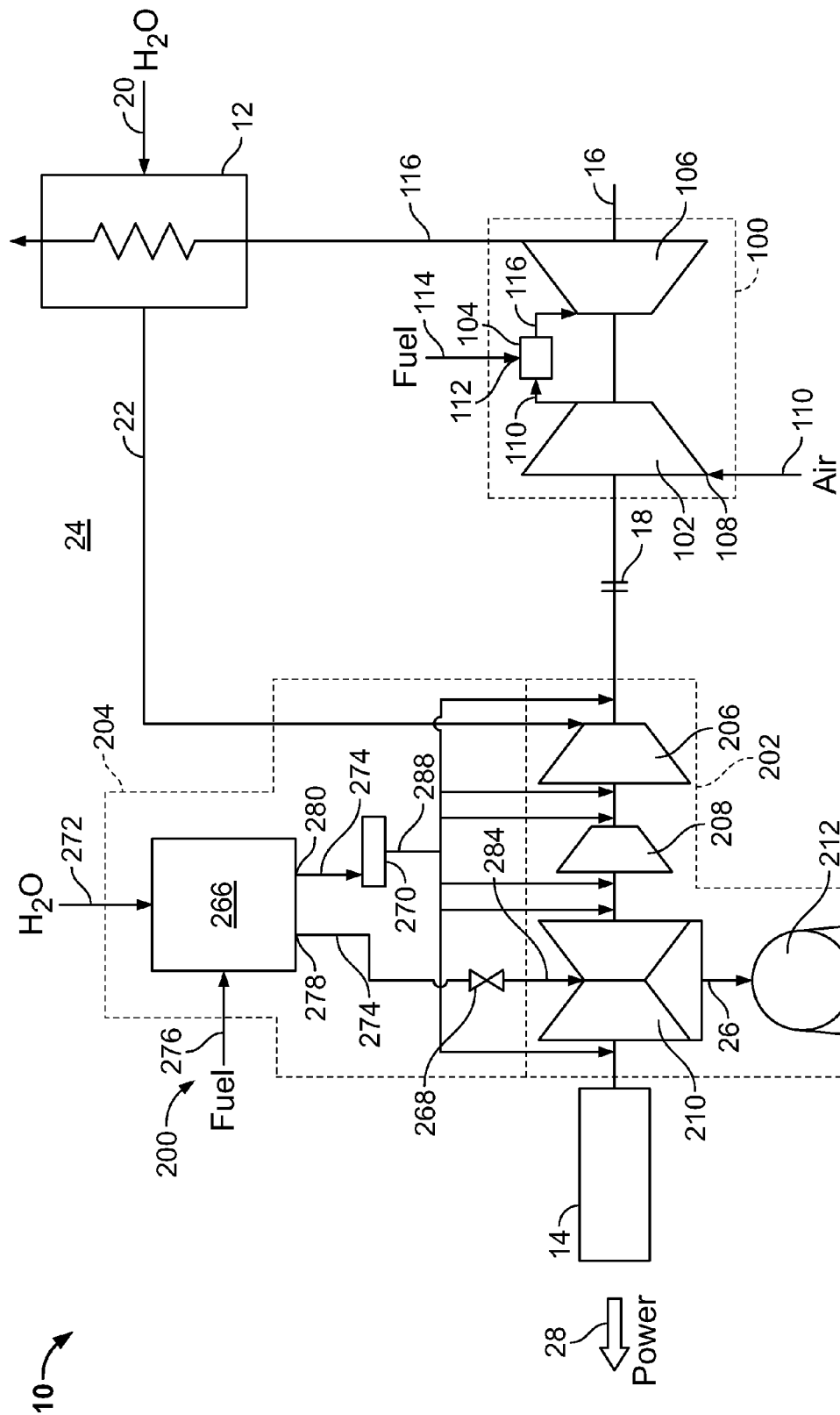
FIG. 1 is a schematic view of an exemplary combined-cycle power plant.
Figure 2:
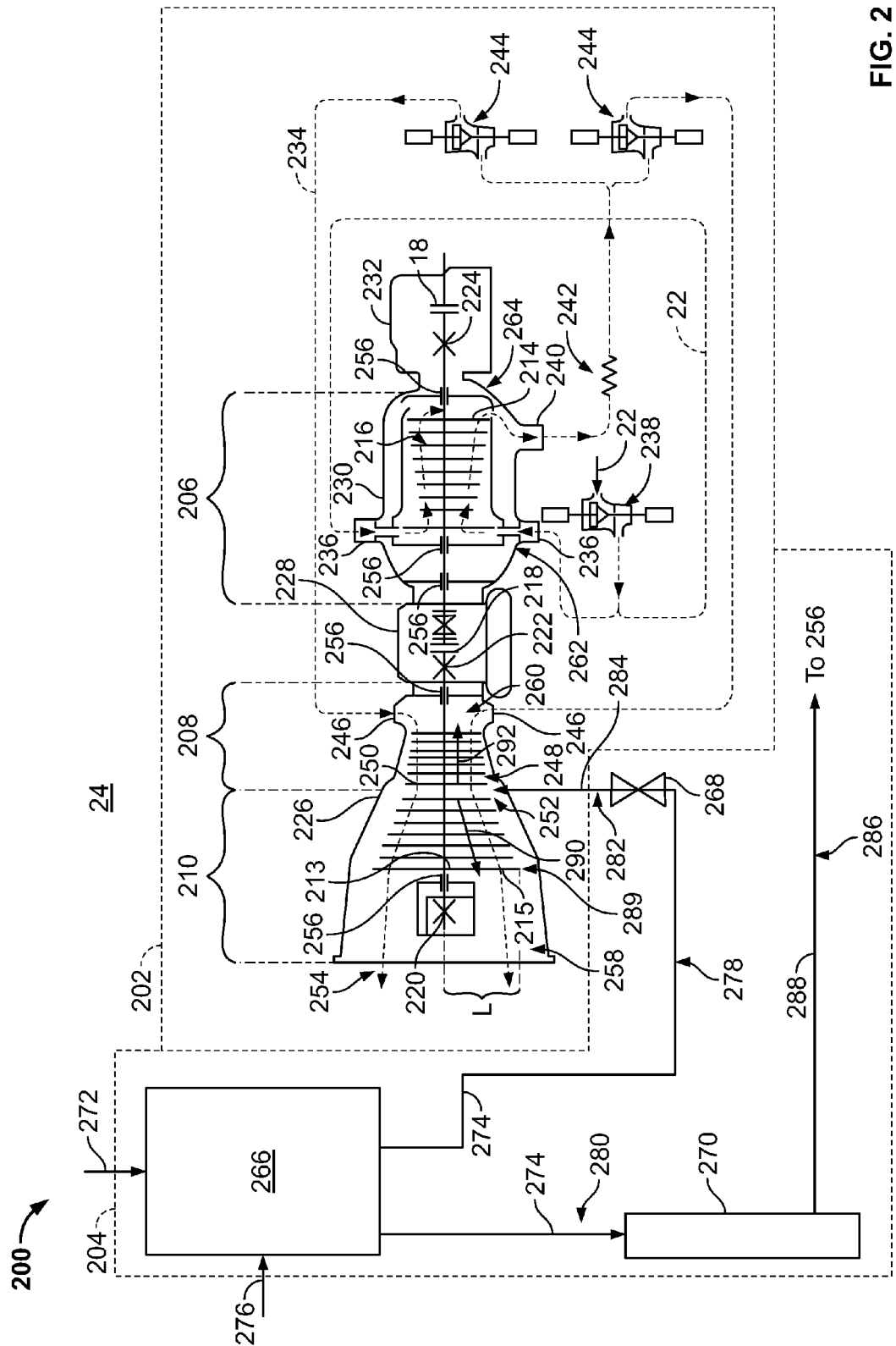
FIG. 2 is a schematic view of an exemplary steam turbine system that may be used with the power plant shown in FIG. 1.
Figure 3:
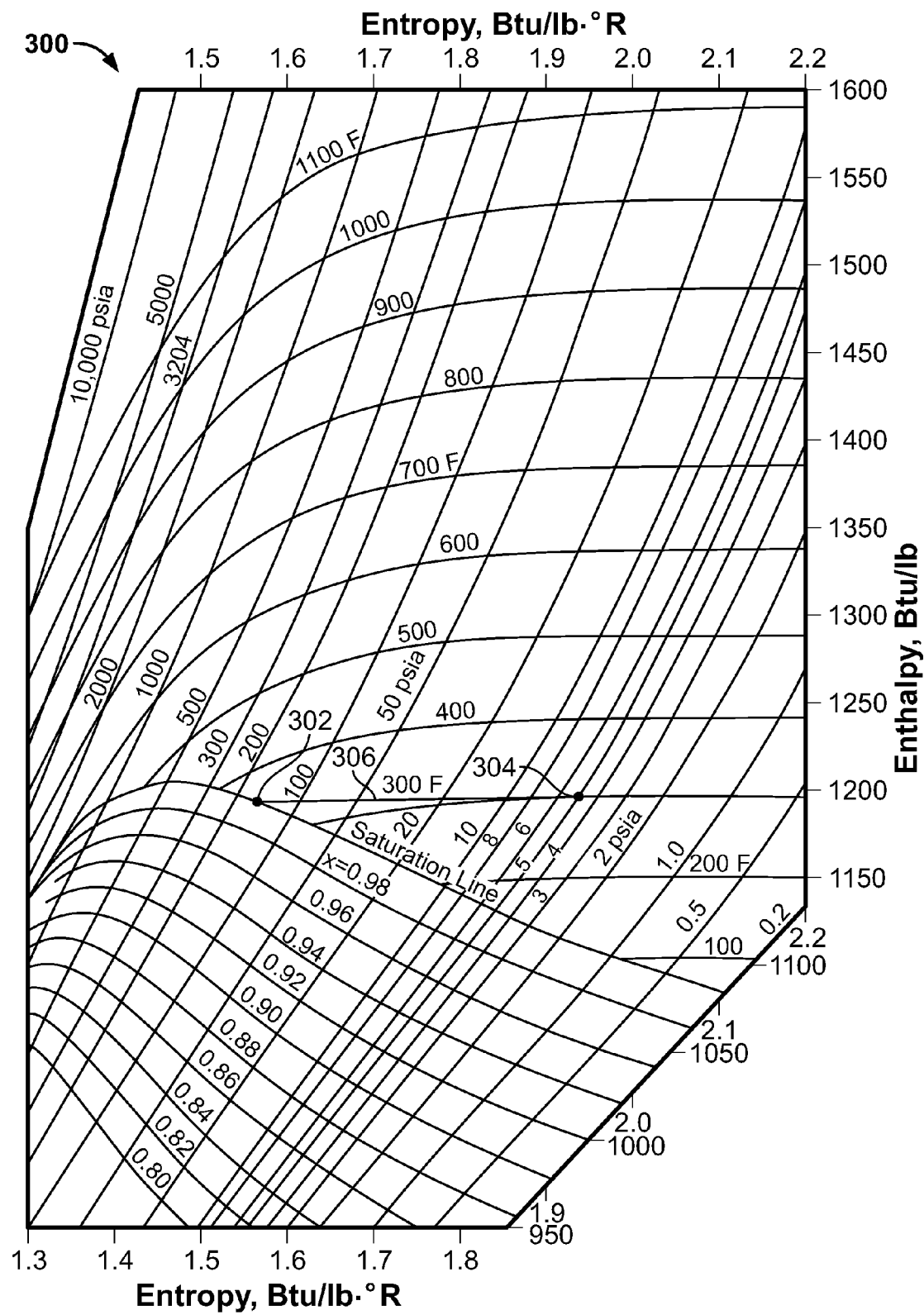
FIG. 3 is a graphical representation of an exemplary enthalpy-entropy diagram that may be used when using the system shown in FIG. 2.
Figure 4:
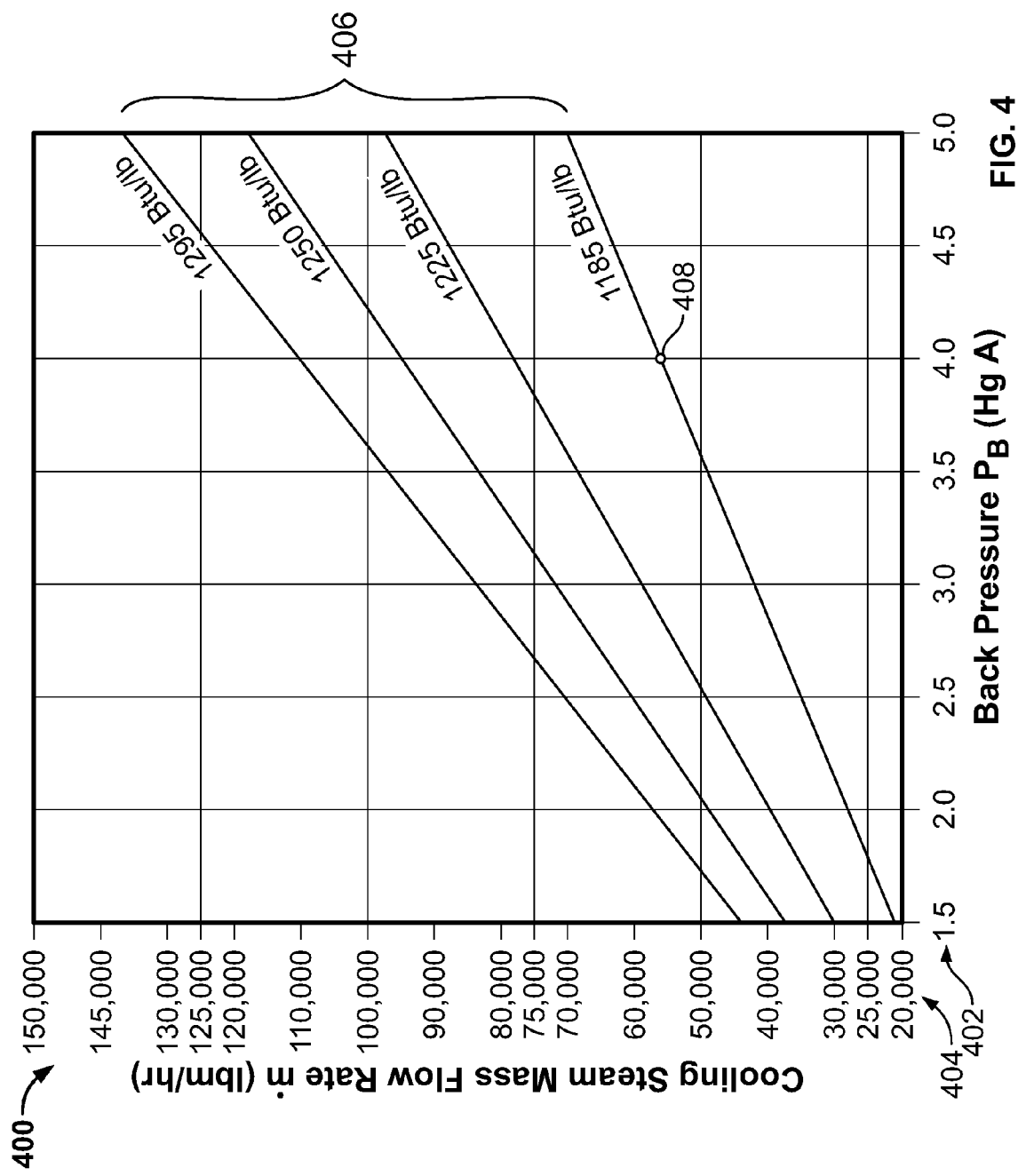
FIG. 4 is a graphical representation illustrating an exemplary relationship between steam turbine backpressure, cooling flow rate, and enthalpy that may be used with the system shown in FIG. 2.

FIG. 1 is a schematic view of an exemplary combined-cycle power plant 10. FIG. 2 is a schematic view of an exemplary steam turbine system 200 that may be used with power plant 10. FIG. 3 is a graphical representation of an enthalpy-entropy diagram 300 (also referred to herein as a "Mollier diagram") that may be used when using steam turbine system 200. FIG. 4 is a graphical representation 400 illustrating an exemplary relationship between steam turbine backpressure 402, cooling flow rate 404, and enthalpy 406 that may be used with steam turbine system 200.

In the exemplary embodiment, power plant 10 includes a gas turbine assembly 100, a steam turbine system 200, a heat recovery steam generator (HRSG) 12, and a generator 14. Moreover, in the exemplary embodiment, steam turbine system 200 includes a steam turbine assembly 202 and a steam turbine cooling system 204, described in more detail below. Power plant 10 may include any other components that enable power plant 10 to function as described herein. In the exemplary embodiment, gas turbine assembly 100 and steam turbine assembly 202 are coupled together via a common rotor shaft 16, which drives generator 14. More specifically, rotor shaft 16 includes a first coupling 18 between gas turbine assembly 100 and steam turbine assembly 202 such that steam turbine assembly 202 may be selectively uncoupled from gas turbine assembly 100.

Gas turbine assembly 100 includes a compressor 102, a combustor 104, and a gas turbine 106. Compressor 102 and gas turbine 106 are each coupled to rotor shaft 16 for rotation therewith. Compressor 102 includes an air inlet 108 for injecting air 110 into compressor 102. Compressor 102 is coupled in flow communication with combustor 104 for supplying compressed air 110 thereto. Combustor 104 includes a fuel inlet 112 for injecting fuel 114 into combustor 104 for combustion therein. Combustor 104 is coupled in flow communication with gas turbine 106 for channeling exhaust gas 116 thereto. Gas turbine 106 is coupled in flow communication with HRSG 12 such that exhaust gases 116 from gas turbine 106 heat water 20 within HRSG 12 to generate steam 22. HRSG 12 may be any type of HRSG that enables plant 10 to function as described herein.

Steam turbine assembly 202 includes a high pressure section 206, an intermediate pressure section 208 (also referred to herein as a reheat section), a low pressure section 210, and a condenser 212. In the exemplary embodiment, steam turbine assembly 202 is a backpressure steam turbine that operates with a backpressure $P_B$ of, for example, approximately 4 HgA. Each section 206, 208, and 210 includes a plurality of buckets 214 that are coupled to rotor shaft 16. More specifically, buckets 214 are arranged into rows 216 that extend circumferentially about shaft 16. High pressure, intermediate pressure, and low pressure sections 206, 208, and 210, respectively, are coupled together in series to rotor shaft 16, as described in more detail below. In the exemplary embodiment, turbine sections 206, 208, and 210 are coupled to shaft 16 such that high pressure section 206 is positioned near gas turbine assembly 100 and low pressure section 210 is positioned near generator 14. Furthermore, in the exemplary embodiment, high pressure section 206 is coupled to intermediate and low pressure sections 210 and 208 at a second coupling 218.

Moreover, steam turbine assembly includes bearings 220, 222, and 224 that are respectively coupled to rotor shaft 16 between low pressure section 210 and generator 14, between intermediate and high pressure sections 20. A first casing 226 substantially isolates low and intermediate pressure sections 210 and 208, respectively, from the surrounding environment 24, a second casing 228 substantially isolates second coupling 218 and bearing 222 from the surrounding environment 24, a third casing 230 substantially isolates high pressure section 206 from the surrounding environment 24, and a fourth casing 232 substantially isolates bearing 224 and first coupling 18 from the surrounding environment 24. In the exemplary embodiment, a steam flow path 234 is defined within steam turbine assembly 202 through casings 226, 228, 230, and 232.

High pressure section 206, in the exemplary embodiment, includes a pair of steam inlets 236 for receiving steam 22 from HRSG 12. Alternatively, steam turbine assembly 202 may receive steam 22 from other sources than HSRG 12, and/or through other than a pair of high pressure section inlets 236. More specifically, in the exemplary embodiment, high pressure section 206 receives steam 22 from HSRG 12 through a first valve 238, which is, for example, a stop and control valve. High pressure section 206 includes an outlet 240 defined within third casing 230. Outlet 240 is configured to discharge steam 22 from section 206. A reheater 242 is coupled between high pressure section 206 and a pair of second valves 244, which are each, for example, intercept valves. Each valve 244 is coupled to an inlet 246 of intermediate pressure section 208. An outlet 248 of intermediate pressure section 208 is adjacent to a vertical joint 250 defined between intermediate and low pressure sections 208 and 210. An inlet 252 of low pressure section 210 is adjacent to joint 250, and an outlet 254 of low pressure section 210 is coupled in flow communication with condenser 212. More specifically, in the exemplary embodiment, low pressure section 210 is coupled in flow communication with condenser 212 such that condensed steam 26 may be discharged into condenser 212 from low pressure section 210.

Moreover, in the exemplary embodiment, steam turbine assembly 202 includes a plurality of endpacking seals, or packing glands, 256 that are coupled adjacent to rotor shaft 16. More specifically, each seal 256 substantially circumscribes shaft 16. Alternatively, steam turbine assembly 202 may include ony one, or no, endpacking seals 256. Endpacking seals 256 are positioned between adjacent casings 226, 228, 230, and 232 of steam turbine assembly 202. More specifically, endpacking seals 256 are positioned between bearing 220 and low pressure section 210 at a first end 258 of casing 226, between intermediate pressure section 208 and bearing 222 at a second end 260 of casing 226, between second coupling 218 and high pressure section 206 at a first end 262 of casing 230, within casing 230 adjacent high pressure section inlets 236, and between high pressure section 206 and bearing 224 at a second end 264 of casing 230. Endpacking seals 256 facilitate preventing steam 22 from being discharged from steam turbine assembly 202 at undesirable locations.

In the exemplary embodiment, steam turbine cooling system 204 includes an auxiliary boiler 266, a pressure control device 268, and a superheater 270. Auxiliary boiler 266 heats water 272 to generate saturated steam 274. More specifically, in the exemplary embodiment, auxiliary boiler 266 combusts fuel 276 to heat water 272, but, alternatively, auxiliary boiler 266 may heat water 272 using any other suitable method and/or technique that enables plant 10 to function as described herein. Further, in the exemplary embodiment, auxiliary boiler 266 includes a first outlet 278 and a second outlet 280 for discharging saturated steam 274 therefrom. First outlet 278 is coupled in flow communication with pressure control device 268, and second outlet 280 is coupled in flow communication with superheater 270. In the exemplary embodiment, pressure control device 268 facilitates reducing the pressure of saturated steam 274, as described in more detail below. Moreover, in the exemplary embodiment, superheater 270 is an electrical superheater that includes a plurality of resistors (not shown) that superheat saturated steam 274. Alternatively, pressure control device 268 may be any other device that enables cooling system 204 to function as described herein. In another embodiment, superheater 270 is other than an electrical superheater.

Pressure control device 268, in the exemplary embodiment, includes an outlet 282 that discharges superheated steam 284 into steam turbine assembly 202. More specifically, because the lengths L of buckets 214 (measured radially from a bucket root 213 to a bucket tip 215) are longer within low and intermediate pressure sections 210 and 208 than the lengths L of buckets 214 within high pressure section 206, and because rotational losses are a function of bucket length, outlet 282 is configured to inject superheated steam 284 into steam turbine assembly 202 at joint 250. Moreover, superheater 270 includes an outlet 286 that channels superheated steam 288 to at least one endpacking seal 256 within steam turbine assembly 202.

During an exemplary plant operation, air 110 is injected through compressor 102 into combustor 104 to combine with fuel 114 injected into combustor 104 for generation of exhaust gases 116. Exhaust gases 116 are channeled through gas turbine 106 to rotate turbine blades (not shown) therein. The rotation of the blades is transmitted to generator 14 via rotor shaft 16 to generate power 28 that may be exported from plant 10 and/or used within plant 10. As such, gas turbine assembly 100 is carrying a load during the exemplary operation. Exhaust gases 116 may heat water 20 within HRSG 12, but steam 22 is not supplied from HRSG 12 to steam turbine assembly 202. As such, steam turbine assembly 202 is not carrying a load during the exemplary operation.

Although steam turbine assembly 202 is not carrying a load during the exemplary operation, buckets 214 within high, intermediate, and low pressure sections 206, 208, and 210, are rotating within respective casings 226 and 230 because the rotation of the gas turbine blades is transmitted to the steam turbine buckets 214 via rotor shaft 16. Such an operation is referred to as a "full-speed, no-load" operation. In the exemplary embodiment, steam turbine buckets 214 rotate at approximately 3000-3600 rpm, depending on the configuration of plant 10, when gas turbine assembly 100 is carrying a load. Furthermore, while steam turbine assembly 202 is operating at full-speed, no-load, the pressure within steam turbine assembly is approximately equal to the pressure of condenser 212. During such full-speed no-load operation, windage within steam turbine assembly 202 heats components therein, such as buckets 214, and creates rotational losses. In the exemplary embodiment, rotational losses are a function of the length of buckets 214, such that the longer buckets 214 generate more rotational losses than the shorter buckets 214.

In the exemplary embodiment, water 272 and fuel 276 are supplied to auxiliary boiler 266. Fuel 276 is combusted within auxiliary boiler 266 to heat water 272. Water 272 is converted into saturated steam 274 as heat is transferred from combusting fuel 276 to water 272. Saturated steam 274 is discharged from auxiliary boiler 266 into pressure control device 268 and superheater 270. The saturated steam 274 discharged from boiler 266 has a quality x that is approximately equal to 99.9%, a pressure $P_1$ that is approximately equal to 150 psia, and a temperature $T_1$ that is approximately equal to 358° F. Referring to FIG. 3, saturated steam 274 is represented on the Mollier diagram 300 for water as a point 302. In the exemplary embodiment, approximately 90% of the saturated steam 274 generated within boiler 266 is channeled to pressure control device 268, and approximately 10% of the saturated steam 274 generated within boiler 266 is channeled to superheater 270.

In the exemplary embodiment, pressure control device 268 facilitates reducing the pressure of saturated steam 274 from pressure $P_1$ to a second pressure $P_2$, wherein pressure $P_2$ is measured at a bowl (not shown) of low pressure section 210. More specifically, in the exemplary embodiment, pressure control device 268 reduces the pressure of saturated steam 274 from approximately 150 psia, or pressure $P_1$, to approximately 5-10 psia, or pressure $P_2$, to generate superheated steam 284. Alternatively, pressure $P_2$ may be any other pressure that enables plant 10 to function as described herein. In one embodiment, pressure $P_2$ may be selected based on a low-pressure bowl admission pressure and effective flow passing area ("LP bowl AeN") and/or a predetermined amount of cooling flow.

Furthermore, in the exemplary embodiment, the enthalpy h of saturated steam 274 is maintained as steam 274 is expanded to form superheated steam 284. In another embodiment, enthalpy h varies as saturated steam 274 expands. In the exemplary embodiment, the enthalpy h of saturated steam 274 is based on the mass flow rate ṁ or cooling and the backpressure $P_B$ of the steam turbine assembly 202, as shown on graph 400 in FIG. 4. Graph 400 does not include the flow of steam 288 to endpacking seal 256, and the Btu/lb values indicated on graph 400 represent the enthalpy of the flow of cooling steam 274 and/or 284. Furthermore, in the exemplary embodiment, the enthalpy h is approximately equal to, for example, 1185 Btu/lb. As saturated steam 274 expands as described herein, saturated steam 274 becomes superheated steam 284 having a temperature $T_2$ that is approximately equal to, for example, 300° F. Superheated steam 284 is represented on Mollier diagram 300 as a point 304, and the expansion process through pressure control device 268 is represented on Mollier diagram 300 as a line 306.

In the exemplary embodiment, superheated steam 284 is channeled from pressure control device 268 to steam turbine assembly 202 at a mass flow rate ṁ to facilitate cooling at least one component therein. In the exemplary embodiment, at pressure $P_2$ and temperature $T_2$, superheated steam 284 is supplied to steam turbine at a flow rate ṁ that is approximately equal to, for example, 55,000 lbm/hr to cool a final row 289 of buckets 214 in low pressure section 210 to a temperature $T_F$ that is approximately equal to, for example, 400° F. Such a rate ṁ corresponds to the enthalpy h, given the backpressure $P_B$. Such a condition is represented by a point 408 on graph 400. Alternatively, the mass flow rate ṁ may be determined based on other cooling parameters.

In the exemplary embodiment, superheated steam 284 is channeled to joint 250 such that a portion 290 of steam 284 flows in a first direction through low pressure section 210, and another portion 292 of steam 284 flows in an opposing second direction through intermediate pressure section 208. Furthermore, in the exemplary embodiment, superheater 270 heats the saturated steam 274 until the saturated steam 274 becomes superheated steam 288. The conditions, such as temperature and pressure, of superheated steam 288 are based on, for example, the temperature of metal within endpacking seals 256. In one embodiment, superheated steam 288 exits superheater 270 a pressure of approximately 130 psia to approximately 140 psia and a temperature of approximately 350° F. to approximately 750° F. Superheated steam 288 is then channeled to at least one endpacking seal 256 to facilitate sealing between casing 226 and/or 230 and rotor shaft 16.

The above-described method and apparatus facilitate cooling a steam turbine component within a combined-cycle power plant. More specifically, the cooling system facilitates providing saturated steam for use in cooling a steam turbine component. More specifically, the cooling system includes a pressure control device that facilitates superheating the saturated steam before the steam is introduced into the steam turbine. As such, the cooling system facilitates reducing the power required to generate superheated steam as compared to power plants that use an electrical superheater and/or superheater integral within the auxiliary boiler to superheat steam before it is introduced into the steam turbine. More specifically, the above-described cooling system enables saturated steam discharged by the boiler to be superheated by a pressure control device rather than a less efficient electrical superheater and/or integral superheater. As such, the auxiliary boiler does not require an integral superheater, which reduces the costs associated with the power plant as compared to power plants that include an auxiliary boiler having an integral superheater.

Furthermore, because the temperature and pressure of the cooling steam entering the steam turbine from the pressure control device are reduced in comparison to the temperature and pressure of steam supplied from an electrical superheater, a lower mass flow rate for the cooling steam may be used to cool components within the steam turbine. As such, the above-described cooling system facilitates reducing the operating costs of the power plant, as compared to power plants that require a higher mass flow rate of steam to cool components within the steam turbine. Moreover, by using the above-described methods and apparatus, the steam turbine may remain coupled to the gas turbine during operating periods when only the gas turbine is carrying a load. As such, the cooling system facilitates preventing the steam turbine and gas turbine from being re-synchronized while the gas turbine is operating.

Exemplary embodiments of a method and apparatus for cooling a steam turbine component are described above in detail. The method and apparatus are not limited to the specific embodiments described herein, but rather, components of the method and apparatus may be utilized independently and separately from other components described herein. For example, the cooling system may also be used in combination with other power plant systems and methods, and is not limited to practice with only the power systems and operations thereof, as described herein. Rather, the present invention can be implemented and utilized in connection with many other turbine cooling applications.

While the invention has been described in terms of various specific embodiments, those skilled in the art will recognize that the invention can be practiced with modification within the spirit and scope of the claims.

What is claimed is:

1. A method of operating a power plant, said method comprising:
    channeling saturated steam from an auxiliary boiler at a first pressure to a pressure control valve, wherein the pressure control valve is coupled in direct flow communication with the auxiliary boiler;
    superheating the steam by decreasing the pressure of the saturated steam from the first pressure to a second pressure using the pressure control valve; and
    channeling the superheated steam towards a steam turbine component to facilitate cooling the component, wherein lowering the pressure of the saturated steam from the first pressure to the second pressure using the pressure control valve maintains the steam in a superheated condition at least until the steam enters the steam turbine.

2. A method in accordance with claim 1 further comprising coupling a steam turbine to a gas turbine such that the steam turbine and gas turbine operate at the same rotational speed.

3. A method in accordance with claim 2 further comprising operating the steam turbine at a no load condition and operating the gas turbine at a loaded condition.

4. A method in accordance with claim 1 further comprising channeling saturated steam from the auxiliary boiler at a first temperature to a superheater.

5. A method in accordance with claim 4 further comprising:
    superheating the saturated steam from the first temperature to a second temperature using the superheater; and
    channeling the superheated steam at the second temperature from the superheater to at least one seal coupled within a steam turbine.

6. A method in accordance with claim 1 wherein superheating the steam by decreasing the pressure of the saturated steam further comprises substantially maintaining an enthalpy of the steam while the steam is superheated.

7. A method in accordance with claim 1 wherein channeling the superheated steam towards a steam turbine component further comprises channeling superheated steam to a joint defined between a low pressure steam turbine section and an intermediate pressure steam turbine section.

8. A method in accordance with claim 7 wherein channeling superheated steam to a joint further comprised channeling superheated steam through the intermediate turbine section in a flow direction that is opposite to a flow direction during loaded operations of the steam turbine.

9. A cooling system for use with a steam turbine, said cooling system comprising:
    an auxiliary boiler; and
    a pressure control valve coupled in direct flow communication with said auxiliary boiler, said pressure control valve superheats saturated steam by reducing the pressure of the saturated steam, said pressure control valve configured to couple in direct flow communication with the steam turbine for supplying superheated steam thereto, wherein said pressure control valve superheats the saturated steam such that the superheated steam remains superheated when received into the steam turbine.

10. A cooling system in accordance with claim 9 further comprising an electric superheater coupled in flow communication with said auxiliary boiler, said electric superheater configured to:
    superheat saturated steam; and
    channel superheated steam to at least one seal coupled within the steam turbine.

11. A cooling system in accordance with claim 9 wherein said pressure control valve facilitates decreasing a temperature of said saturated steam from a first temperature to a second temperature.

12. A cooling system in accordance with claim 9 wherein said pressure control valve is configured to substantially maintain the enthalpy of the saturated steam.

13. A cooling system in accordance with claim 9 wherein said cooling system is configured to supply saturated steam to said steam turbine while said steam turbine is operating at a first operating condition.

14. A combined-cycle system comprising:
    a gas turbine;
    a steam turbine coupled to said gas turbine via a rotor shaft; and
    a steam turbine cooling system coupled in flow communication with said steam turbine, said cooling system comprising:
        an auxiliary boiler; and
        a pressure control valve coupled in direct flow communication with said auxiliary boiler and in direct flow communication with the steam turbine, said pressure control valve configured to form superheated steam by reducing the pressure of saturated steam such that the superheated steam remains superheated when received into said steam turbine.

15. A combined-cycle system in accordance with claim 14 wherein said pressure control valve is configured to channel the superheated steam to at least one component within said steam turbine.

16. A combined-cycle system in accordance with claim 14 wherein said pressure control valve is configured to decrease an operating temperature of said saturated steam from a first temperature to a second temperature.

17. A combined-cycle system in accordance with claim 14 wherein said pressure control valve is configured to substantially maintain the enthalpy of said saturated steam.

18. A combined-cycle system in accordance with claim 14 wherein said cooling system is configured to supply saturated steam to said steam turbine when said steam turbine is in a first operating condition and said gas turbine is in a second operating condition that is different than the first operating condition.

19. A combined-cycle system in accordance with claim 18 wherein the first operating condition is no load condition.

20. A combined-cycle system in accordance with claim 18 wherein the second operating condition is a loaded condition.

* * * * *